United States Patent

[11] 3,601,244

| [72] | Inventors | George F. Ort<br>Murray Hill;<br>William T. Holzhauer, Basking Ridge, both of, N.J. |
|---|---|---|
| [21] | Appl. No. | 837,815 |
| [22] | Filed | June 30, 1969 |
| [45] | Patented | Aug. 24, 1971 |
| [73] | Assignee | Esso Research and Engineering Company |

[54] COMBINATION STOCKPILER RECLAIMER
7 Claims, 5 Drawing Figs.

[52] U.S. Cl. ..................................................... 198/36, 214/10
[51] Int. Cl. ..................................................... B65g 65/28
[50] Field of Search ........................................... 214/10; 198/36, 118, 119, 121, 124, 125, 5, 8, 9-14

[56] References Cited
UNITED STATES PATENTS

| 897,893 | 9/1908 | Hamilton | 198/11 |
| 1,423,878 | 7/1922 | Potter et al. | 198/118 |
| 3,049,244 | 8/1962 | Hansen | 214/10 |
| 3,419,131 | 12/1968 | Patz | 198/125 |

Primary Examiner—Evon C. Blunk
Assistant Examiner—Alfred N. Goodman
Attorneys—Manahan and Wright and Donald F. Wohlers ABSTRACT: An inclined conveyor which is loaded with bulk material at its low end and discharged at its high end is disposed in a first position with the low end under a bulk material feed source when said conveyor operates as a stockpiler and a second position with the low end in communication with a bulk material feeder, when said conveyor operates as a reclaimer. A first means is provided for movement of the inclined conveyor between said first and said second position. A second means is provided for pivotable movement of said inclined conveyor about one of its ends.

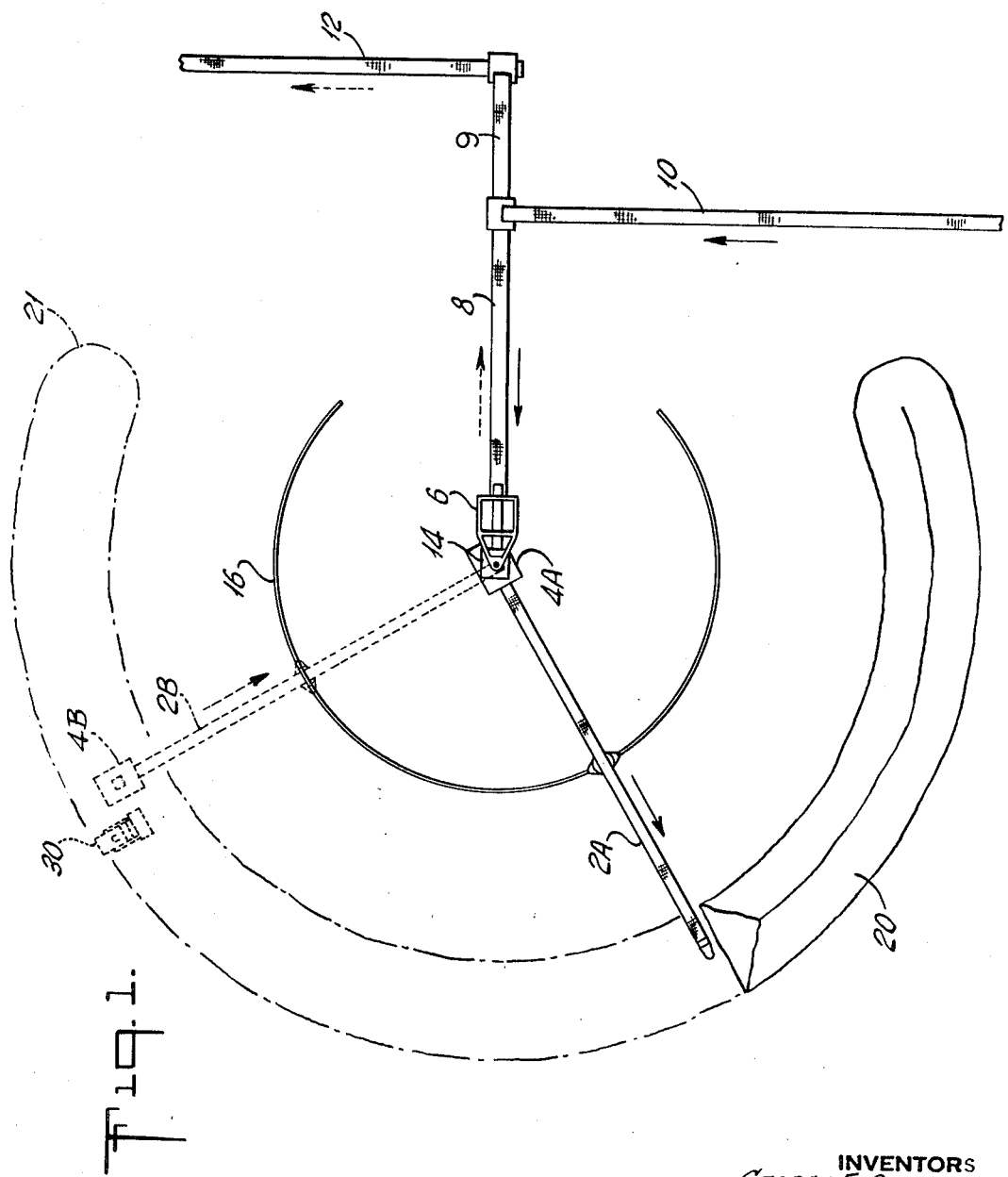

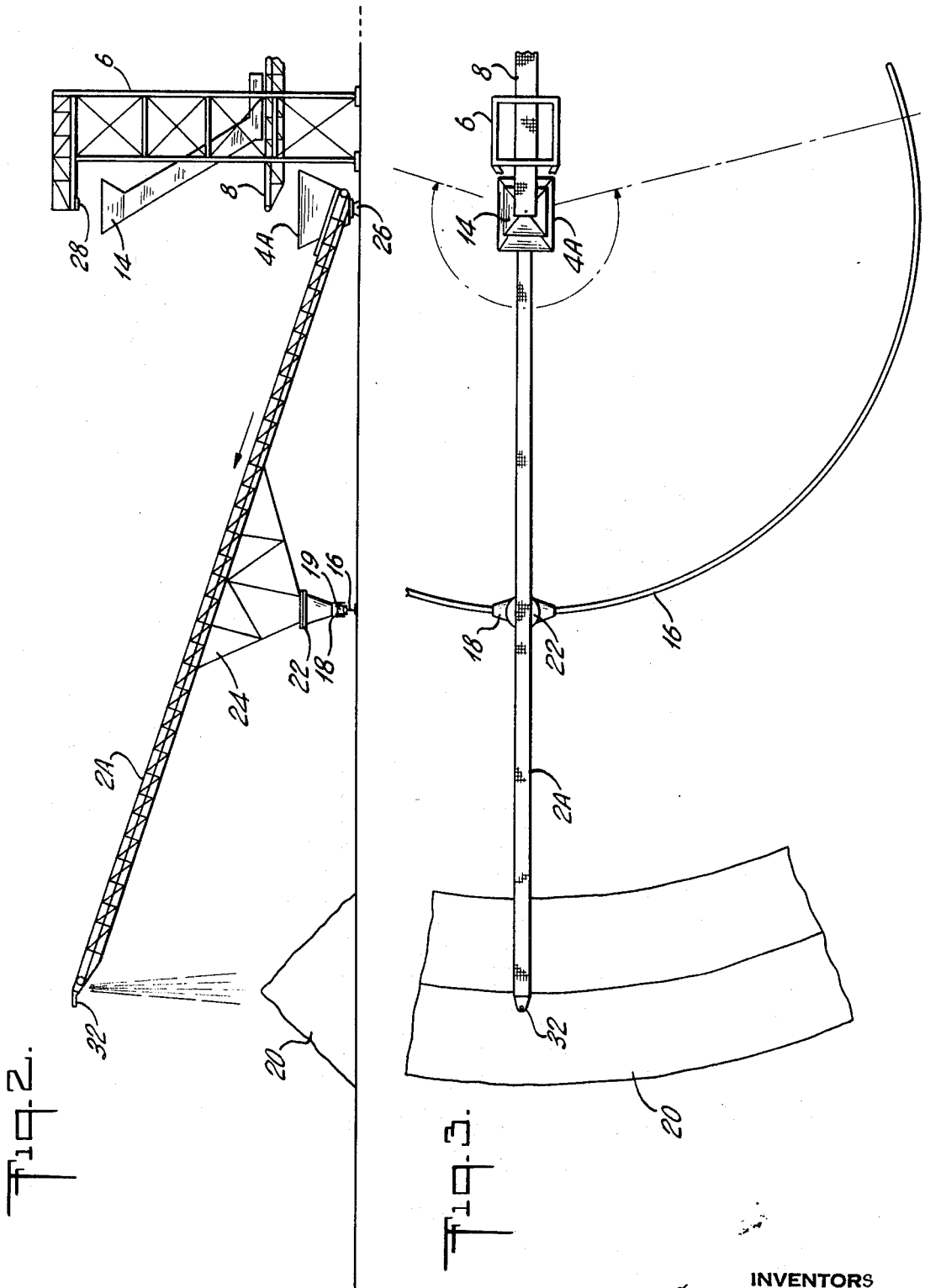

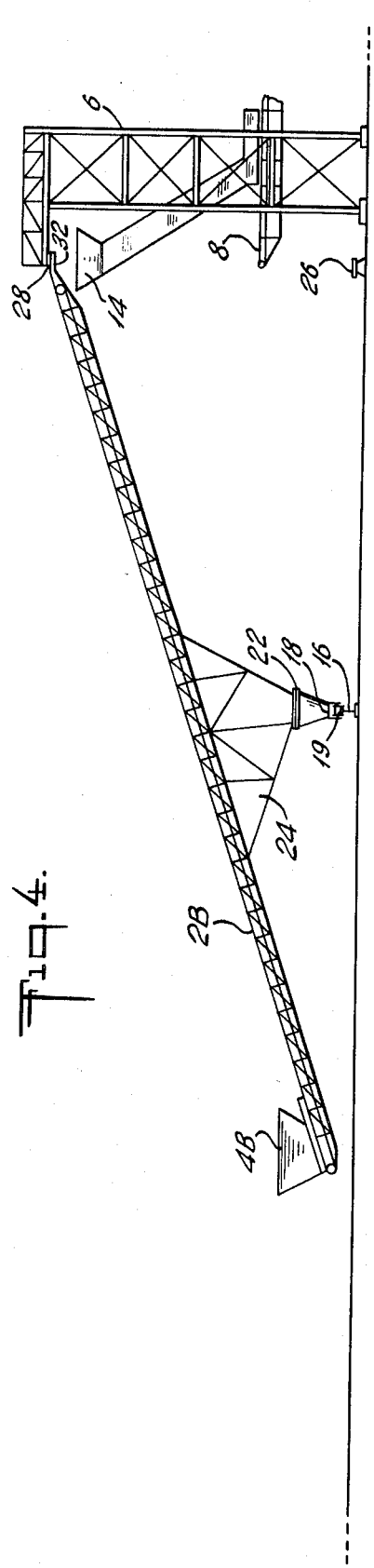
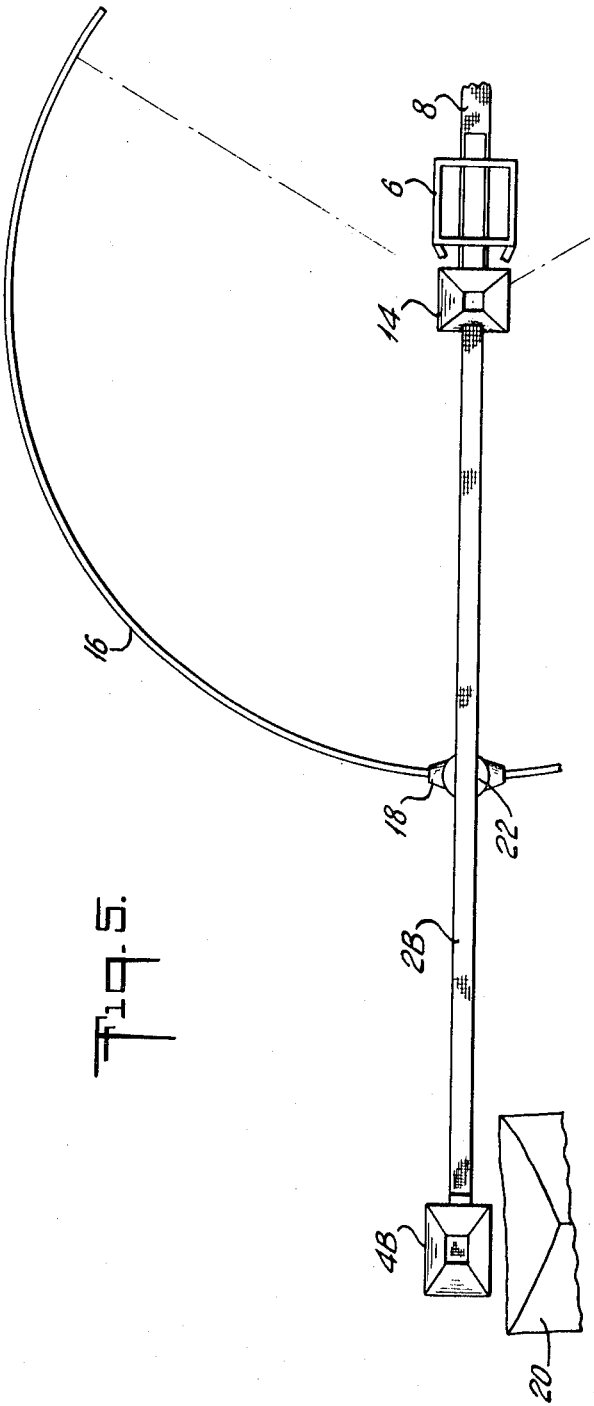

COMBINATION STOCKPILER RECLAIMER

BACKGROUND OF THE DISCLOSURE

Inclined belt conveyors are often employed as stockpilers for the stockpiling of bulk materials from a central feed source. In a typical arrangement, the stockpiler is loaded at its low end and discharged into stockpiles from its high end. The stockpiler may be disposed on a curved track so that the stockpiler may be pivoted about its low end. Thus, the bulk material is discharged from the upper end of the inclined conveyor in a circular arc about the pivot point.

In the prior art, large curve-shaped stockpiles thus formed by a stockpiler of the above type were reclaimed by expensive mobile or fixed digging equipment or in the alternate by gravity through a grade level gate. Hence, in all cases, separate conveying equipment was needed to remove the bulk material from the stockpile vicinity for subsequent processing or shipment. It was the configuration of the stockpile which caused the additional requirement for heavy capital equipment or in the alternate expensive gravity methods. Stockpilers of the above-described kind discharge stockpiles in a circular configuration. Thus, additional equipment was required to move along this curved path to reclaim bulk material contained in the curve-shaped stockpile.

A principal object of the instant invention is to provide a combination stockpiler-reclaimer so that bulk material stored in curve-shaped stockpiles by a stockpiler of the kind described above may be reclaimed to a central discharge point with no additional capital expense and with no more difficulty than that required to stockpile materials originally.

Another principal object of the instant invention is to provide a reclaimer that can conveniently and easily reclaim bulk material in circular or curve-shaped piles.

SUMMARY OF THE INVENTION

In accordance with the instant invention an inclined conveyor is provided which moves in a curved path about one of its ends, said conveyor is characterized by loading of bulk material at its low end and discharge of said bulk material at its high end. Means are provided for rotating the conveyor so that the low end of the conveyor can be disposed in a first position adjacent to a bulk material feed source and in a second position adjacent to a stockpile of bulk material. Thus, the apparatus of the instant invention may be employed as a stockpiler and a reclaimer respectively.

BRIEF DESCRIPTION OF THE DRAWINGS

FIG. 1 is a plan view of the instant invention with the inclined conveyor shown in full lines as a stockpiler and in dotted as a reclaimer;

FIGS. 2 and 3 are side elevation and plan views respectively of the instant invention acting as a stockpiler;

FIGS. 4 and 5 are side elevation and plan views respectively of the instant invention acting as a reclaimer.

DETAILED DESCRIPTION

FIG. 1 illustrates the overall apparatus of the instant invention operating as both a stockpiler and a reclaimer. When acting as a stockpiler (position A) the flow of bulk material is denoted by the solid arrows. The apparatus performs as a reclaimer in position B with dotted line arrows indicating the movement of the bulk material.

An understanding of the method of operation of the instant invention as a stockpiler may be had by following the solid arrows in FIG. 1. Bulk material, such as iron ore, shale, fluid coke, and the like are supplied from a supply source onto a conveyor 10. In a preferred embodiment conveyor 10 as well as all of the conveyors to be described hereinafter are of the belt type. The bulk material is conveyed on conveyor 10 to a second conveyor 8. Conveyor 8 can move in either of two opposite directions, toward or away from the central loading or discharge point to be described in greater detail hereinafter. In the instant application conveyor 8, a belt conveyor, moves the bulk material from conveyor 10 which discharges into a feed hopper 4 (position A) mounted on an inclined conveyor 2. The bulk material is loaded onto the lower end of conveyor 2 from feed hopper 4 moving up the conveyor and discharging from the high end. While this loading and discharge of bulk material on inclined conveyor 2 is going on, the conveyor may be pivoted about its low end in a circular path. The path through which the stockpiler moves when pivoted is dictated by a track 16 on which at least one rail wheel 19 is disposed. The rail wheel 19 is connected to a rail support structure 18 which in turn is connected to the bottom of the inclined conveyor 2. The bulk material is discharged from the high end of the conveyor 2 while the inclined conveyor 2 moves along the curved path, thus forming a curve-shaped stockpile 20. This arrangement provides for the maximum area over which bulk material may be stockpiled from a single pivoted stockpiler.

FIG. 1, position B, illustrates the apparatus of the instant invention as a reclaimer. As a reclaimer, the low end of the conveyor 2B and the feed hopper 4B disposed thereon (in dotted lines) are located adjacent to the stockpile 20. Thus, the bulk material contained in stockpile 20 is conveyed onto a moving belt disposed on conveyor 2 through the feed hopper 4. For purposes of illustration a loading means, such as an earth moving vehicle 30 is illustrated to show how the bulk material might be loaded into the hopper 4B. The area denoted by 21 is assumed to be the area over which the conveyor 2 has already moved. Thus, area 21 is assumed to be denuded of any bulk material since the material originally contained in area 21 has already been reclaimed. It should be appreciated that the dotted area 21 may just as easily be assumed to be the area over which bulk material is yet to be discharged while the inclined conveyor 2A operates as a stockpiler.

The bulk material upon loading on inclined conveyor 2B moves up the conveyor 2B through a chute 14 onto conveyor 8, which in this case is moving in the direction denoted by the dotted arrow and therefrom to the location desired by means of conveyors 9 and 12. Conveyors 9 and 12 are illustrated to indicate a typical movement of the bulk material away from conveyor 8.

FIGS. 2 and 3 illustrate the use of the instant invention as a stockpiler in greater detail. The inclined conveyor 2 is disposed between a support tower 6 and a point at which the bulk material is to be discharged. The low end of the conveyor 2 is equipped with a feed hopper 4. The conveyor 2 is supported by means of a conveyor support structure 24 disposed on the underside of the framework of the inclined conveyor 2. Support structure 24 is characterized by its ability to be adjusted so as to change the angle of inclination of the conveyor 2. Thus, the discharge height of the inclined conveyor 2 may be adjusted. This permits the profile of the stockpile 20 to vary according to the requirements of the situation.

The support structure 24 is connected to a rail wheel support structure 18. The two support structures are connected by means of a swivel 22 which will be described in greater detail hereinafter. The rail wheel support structure 18 is connected to at least one rail wheel 19 which is disposed on a track 16. Thus, the movable support for the inclined conveyor 2 comprises the adjustable support structure 24, the rail wheel support structure 18, at least one rail wheel 19 and the track 16.

In operation bulk material is discharged into the feed hopper 4 from the conveyor 8. The bulk material moves from the hopper 4 onto conveyor 2 and is discharged from the high end of conveyor 2 thus forming a stockpile 20. During stockpiling the low end of the conveyor is fixed, disposed on a pivot platform 26. The remainder of the conveyor 2 is pivoted, moving along the track 16 as has been described above. In this way a curved stockpile 20 is generated.

The apparatus of the instant invention is converted into a reclaimer by means disposed on said inclined conveyor 2 which permits the conveyor to be rotated through an angle of 180° resulting in the lower end being disposed at the point along the stockpile 20, and the high end disposed at the support tower 6. The means provided to accomplish this rotation, in a preferred embodiment, is the swivel 22 disposed between the support structure 24 and the rail support structure 18. If desired a motor may be connected to the swivel or turntable 22 and thus rotation may be accomplished by electrical power. Alternately, if the conveyor 2 is of small enough size this turn may be accomplished manually. Hence, the swivel 22 provides the means by which the inclined conveyor 2 is disposed in two positions such that the same apparatus functions as a stockpiler and as a reclaimer.

FIGS. 4 and 5 give a better understanding of the operation of the instant invention as a reclaimer. When the apparatus of the instant invention performs as a reclaimer the conveyor 2 pivots about its high end. In order to facilitate this, the high end is equipped with a trailer hitch 32 which is provided with a hole into which a pivot pin 28 is disposed. The pivot pin 28 connects the inclined conveyor 2 to the top of the support tower 6. Hence, the conveyor 2 moves along the same path taken by the inclined conveyor when it operated as a stockpiler since the pivot pin 28 is directly above the pivot platform 26. Thus, the feed hopper 4 which is disposed on the low end of the conveyor 2 is able to move along the stockpile 20. This is an advancement over prior art reclaimers which require difficult and complex maneuverings to move the conveyor along a curve-shaped stockpile. The stockpiled bulk material is loaded into the feed hopper 4, the hopper 4 remaining adjacent to the end of the stockpile 20. The bulk material moves up the inclined conveyor 2 to the high end located at the top of the support tower 6. It should be appreciated that the direction of movement of the belt on conveyor 2 does not change whether the conveyor 2 operates as a stockpiler or a reclaimer. The bulk material from the stockpile 20 is discharged from the top end of the inclined conveyor 2 into a chute 14. Chute 14 which is connected to the support tower 6 discharges onto conveyor 8. The bulk material is thereafter moved along conveyor 8 to the place of usage as has been described above. It should be appreciated that the movement of the belt is now opposite the direction of movement of conveyor 8 when it operated as part of the stockpiler.

It will be understood that the above invention is a preferred embodiment and that various modifications may be made without departing from the fundamental invention herein disclosed.

What is claimed is:

1. An apparatus comprising:
   an inclined conveyor having a low end for loading of bulk material and a high end for discharge of bulk material, said conveyor being positionable in a first position for stockpiling bulk material and in a second position for reclaiming of bulk material;
   means for pivotally supporting said low end adjacent bulk material feed source when said conveyor is in said first position;
   means for pivotally supporting said high end adjacent an outgoing conveyor when said conveyor is in the second position;
   movable support means between said high and said low end of said conveyor for moving said conveyor along the curved path about one of its ends; and
   means for rotating said conveyor on said support means from said first position to said second position.

2. The apparatus of claim 1 wherein said movable support means comprises at least one rail wheel held by a supporting frame and disposed on a curved track.

3. The apparatus of claim 1 wherein the means for rotating said conveyor on said support means is a swivel.

4. The apparatus of claim 1 including a feed hopper disposed at said low end of said inclined conveyor for loading of said bulk material onto said conveyor.

5. The apparatus of claim 1 wherein said means for pivotally supporting said high end of said conveyor includes a support tower having pivot connecting means disposed at the top of said tower whereby said inclined conveyor can be pivotally connected and supported by said tower and moved in a curved path about said upper end of said conveyor when said conveyor is in said second position.

6. The apparatus of claim 5 wherein a pivot pin is disposed on said support tower and a trailer hitch is disposed at the high end of said inclined conveyor whereby the conveyor can be pivotally connected and supported by said tower.

7. The apparatus of claim 5 including a chute connected to said support tower adapted to be in communication with said upper end of said inclined conveyor and an outgoing conveyor belt when said inclined conveyor is in the second position.